United States Patent
Levin et al.

(10) Patent No.: US 9,519,495 B2
(45) Date of Patent: Dec. 13, 2016

(54) TIMED API RULES FOR RUNTIME VERIFICATION

(71) Applicant: Microsoft Technology Licensing, LLC, Redmond, WA (US)

(72) Inventors: Vladimir A. Levin, Redmond, WA (US); Juncao Li, Bellevue, WA (US); Jakob Frederik Lichtenberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 13/918,857

(22) Filed: Jun. 14, 2013

(65) Prior Publication Data

US 2014/0372986 A1  Dec. 18, 2014

(51) Int. Cl.
    G06F 9/44    (2006.01)
    G06F 9/445   (2006.01)
    G06F 11/36   (2006.01)

(52) U.S. Cl.
    CPC ....... *G06F 9/44589* (2013.01); *G06F 11/3612* (2013.01)

(58) Field of Classification Search
    CPC .................................................. G06F 11/3612
    USPC ....................................................... 717/126
    See application file for complete search history.

(56) References Cited

U.S. PATENT DOCUMENTS

| | | | |
|---|---|---|---|
| 7,076,764 B2 | 7/2006 | Kramer | |
| 7,111,307 B1 | 9/2006 | Wang | |
| 7,673,174 B2 | 3/2010 | Swift et al. | |
| 7,886,273 B2 | 2/2011 | Hinchey et al. | |
| 7,979,849 B2 * | 7/2011 | Feldstein et al. | 717/128 |
| 8,265,100 B2 | 9/2012 | Steiner et al. | |
| 8,387,021 B2 | 2/2013 | Vanoverberghe et al. | |
| 2004/0019468 A1 | 1/2004 | De Moura et al. | |
| 2004/0143814 A1 | 7/2004 | de Jong | |

(Continued)

OTHER PUBLICATIONS

Lee, Duckwoong et al.; "Timer Embedded Finite State Machine Modeling and Its Application"; ECMS; 2010.*

(Continued)

*Primary Examiner* — Qing Chen
*Assistant Examiner* — Clint Thatcher
(74) *Attorney, Agent, or Firm* — Sunah Lee; Dan Choi; Micky Minhas

(57) ABSTRACT

A stateful rules verification platform is described that support timed state transitions. The verification platform implements a specification language to provide a formal definition for rules used to test target systems having a central module that provides APIs ("API provider") and applications ("API clients") that use the APIs. Rules may be defined in terms of transitions on state elements associated with interactions between API providers and API clients. The rules defined in accordance with the specification language enable run-time verification in which calls may be intercepted and run-time code to implement checks may automatically be generated and injected to test behaviors of the intercepted calls. The same set of rules may also be employed for static verification during compilation. Additionally, the specification language includes constructs to specify timed state transitions for at least some rules that impose time limits on state transitions specified by the rules.

20 Claims, 8 Drawing Sheets

(56) References Cited

U.S. PATENT DOCUMENTS

| | | | |
|---|---|---|---|
| 2006/0271917 | A1 | 11/2006 | Das et al. |
| 2007/0209032 | A1 | 9/2007 | Mihai et al. |
| 2009/0249368 | A1 | 10/2009 | Needamangala |
| 2010/0306743 | A1 | 12/2010 | Underseth |
| 2011/0282640 | A1 | 11/2011 | Mohalik et al. |
| 2014/0372985 | A1 | 12/2014 | Levin et al. |

OTHER PUBLICATIONS

"Interceptor pattern"; Wikipedia.com website; Mar. 20, 2013.*
Tony Sintes; "Events and Listeners: How do You Create a Custom Event?"; JavaWorld.com website; Aug. 4, 2000.*
Ball, et al., "SLAM and Static Driver Verifier: Technology Transfer of Formal Methods Inside Microsoft", *In Fourth International Conference on Integrated Formal Methods*, vol. 2999, (Apr. 4, 2004), pp. 1-20.
Kuznetsov, et al., "Testing Closed-Source Binary Device Drivers with DDT", *In Proceedings of the USENIX Annual Technical Conference*, (Jun. 2010), pp. 1-14.
Srivastava, et al., "Efficient Monitoring of Untrusted Kernel-Mode Execution", *In Proceedings of the Network and Distributed System Security Symposium*, (Feb. 6, 2011),18 pages.
Swift, Michael M., "Device Driver Reliability", *In Book of Advanced Operating Systems and Kernel Applications: Techniques and Technologies*, (Oct. 15, 2009), 3 pages.
Zheng, et al., "Achieving High Reliability on Linux for K2 System", *In IEEE/ACIS 11th International Conference on Computer and Information Science*, (May 30, 2012), pp. 107-112.
"Javadoc Tutorial", Retrieved from <http://web.archive.org/web/20121101025137/http://students.cs.byu.edu/~cs240ta/fall2012/tutorials/javadoctutorial.html> on Jul. 31, 2014, Nov. 1, 2012, 3 pages.
"Non-Final Office Action", U.S. Appl. No. 13/918,851, Aug. 14, 2014, 26 pages.
"Verificator", Retrieved from <http://web.archive.org/web/20140801193318/http://www.iar.com/Products/IAR-visualSTATE/Components/Verificator/> on Aug. 18, 2014, Nov. 6, 2011, 5 pages.
Alur, Rajeev, "Formal Verification of Hybrid Systems", In Proceedings of the Ninth ACM International Conference on Embedded Software, Oct. 9, 2011, pp. 6.
Ball, et al., "A Decade of Software Model Checking with SLAM", In Communications of the ACM, vol. 54, Issue 7, Jul. 2011, pp. 9.
Kucera, et al., "Implementation of Timed Automata in a Real-time Operating System", In Proceedings of the World Congress on Engineering and Computer Science, Oct. 20, 2010, pp. 5.
Lomuscio, et al., "Runtime Monitoring of Contract Regulated Web Services", In Proceedings of the 9th International Conference on Autonomous Agents and Multiagent Systems, May 10, 2010, pp. 17.
Morbe, et al., "Fully Symbolic Model Checking for Timed Automata", In Proceedings of the 23rd International Conference on Computer Aided Verification, Jul. 2011, 17 pages.
"About Driver Verifier", Retrieved at: <<http://msdn.microsoft.com/en-us/library/windows/hardware/gg487310.aspx>>, Mar. 13, 2012, p. 1.
"Verification Platform for API Clients Based on Formal API Rules (TFS7483 Driver Verifier)", U.S. Appl. No. 13/918,851, filed Jun. 14, 2013, pp. 45.
"Final Office Action", U.S. Appl. No. 13/918,851, Feb. 12, 2015, 30 pages.
Math "Check Code for Errors and Warnings", Retrieved from <http://web.archive.org/web/20120923011207/http://www.mathworks.com/help/matlab/matlab_prog/check-code-for-errors-and-warnings.html> on Feb. 12, 2015, 2012, 9 pages.
"Final Office Action", U.S. Appl. No. 13/918,851, Oct. 15, 2015, 36 pages.
"Non-Final Office Action", U.S. Appl. No. 13/918,851, Jun. 5, 2015, 31 pages.

* cited by examiner

300
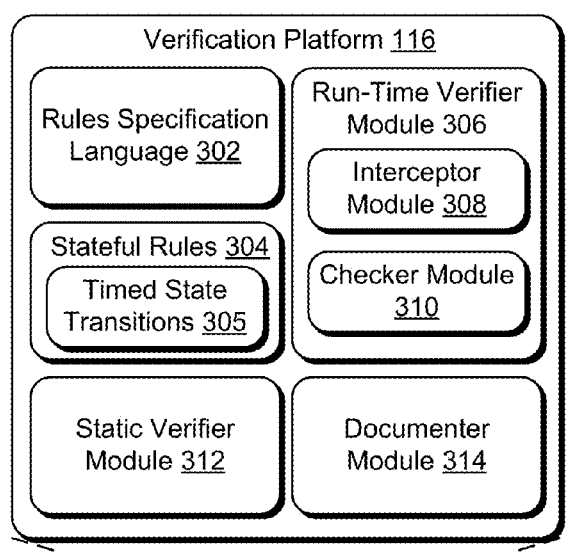
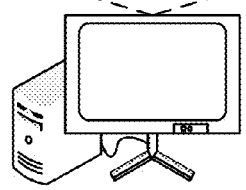
Client Device 102
Fig. 3

TIMED API RULES FOR RUNTIME VERIFICATION

BACKGROUND

In many code development scenarios developers seek to verify that code adheres to rules prescribed for interaction of the code with other components. An example of such a scenario is in the context of driver code that may call into and/or be called through various operating system components (e.g., tools, functions, interfaces, services, and so forth) to take advantage of operating system features and/or cause operation of a corresponding device. More generally, verification techniques may be applied to client applications that take advantage of functionality provided by a central module to extend the central module. Verifications may be performed to detect and address instances in which code misbehaves in some manner or causes a computing system to freeze/crash (e.g., detect "bugs").

Verification may involve analysis that is performed to verify compliance of a complete code project against a set of rules, such as by analyzing a driver as a whole. Traditionally, verification rules are individually defined and tests for compliance with the rules must be manually coded into the verification system. Thus, implementing rules for complex code projects may be time consuming and resource intensive. Further, it is difficult to modify the rules or add new rules due to overhead associated with making changes to the verification system. Moreover, distinct set of rules that may have different forms are traditionally authored by different people for different types of verifications (e.g., static vs. run-time) and/or different types of client code. This approach results in inconsistent rules that may be difficult for a developer to understand and redundant work to create and maintain multiple distinct set of rules. Thus, traditional verification techniques may be inefficient and/or inadequate for some types of software systems and corresponding testing scenarios.

SUMMARY

A verification platform that implements stateful rules including timed state transitions for verification of code projects is described herein. The verification platform may be designed to facilitate verification of target systems composed of a central module that provides application programming interfaces (APIs), e.g., an "API provider", for use by other application modules, e.g., "API clients," to take advantage of functionality provided by the central module. In one or more implementations, the verification platform implements a specification language to provide a formal definition for rules. Using the specification language, rules may be defined in terms of transitions on state elements associated with interactions between API providers and API clients. The rules defined in accordance with the specification language enable run-time verification in which calls may be intercepted and run-time code to implement checks may automatically be generated and injected to test behaviors of the intercepted calls. The same set of rules may also be employed for static verification during compilation. Additionally, the specification language includes constructs to provide rule descriptions and comments with rules definitions that facilitate publication of the rules and documentation of misbehavior identified during verification. The verification platform and specification language further support rules that employ timed state transitions to impose time limits upon transitions indicated by the rules. The timed state transitions are designed to detect situations (e.g., bugs or misbehavior) in which the system hangs or otherwise fails to reach an expected state within a prescribed amount of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 3 is a diagram depicting details of an example verification platform in accordance with one or more implementations.

DETAILED DESCRIPTION

Overview

Traditionally, verification rules are manually coded into a verification system and distinct set of rules may be authored by different people using different styles and/or ad hoc methods for different types of verifications (e.g., static vs. run-time), which results in inflexible and inconsistent rules that may be difficult to understand and maintain. Accordingly, traditional verification techniques may be inefficient and/or inadequate for some types of software systems and corresponding testing scenarios.

A verification platform that implements stateful rules including timed state transitions for verification of code projects is described herein. The verification platform may be designed to facilitate verification of target systems composed of a central module that provides application programming interfaces (APIs), e.g., an "API provider", for use by other application modules, e.g., "API clients," to take advantage of functionality provided by the central module. For example, the techniques described herein may be applied to device drivers, system drivers, and services that interact with system APIs provided by an operating system. In one or more implementations, the verification platform implements a specification language to provide a formal definition for rules. Using the specification language, rules may be defined in terms of transitions on state elements associated with interactions between API providers and API clients. The rules defined in accordance with the specification language enable run-time verification in which calls may be intercepted and run-time code to implement checks may automatically be generated and injected to test behaviors of the intercepted calls. The same set of rules may also be employed for static verification during compilation. Additionally, the specification language includes constructs to provide rule descriptions and comments with rules definitions that facilitate publication of the rules and documentation of misbehavior identified during verification. The verification platform and specification language further support rules that employ timed state transitions to impose time limits upon transitions indicated by the rules. The timed state transitions are designed to detect situations (e.g., bugs or misbehavior) in which the system hangs or otherwise fails to reach and expected state within a prescribed amount of time.

In the following discussion, an example operating environment is first described that may employ the techniques described herein. Next, example details and techniques are described which may be implemented in the example environment as well as other environments. Consequently, performance of the techniques is not limited to the example environment and the example environment is not limited to performance of the example techniques. Lastly, example systems and devices are described that may be employed to implement one or more embodiments.

Example Operating Environment

Figure 1:
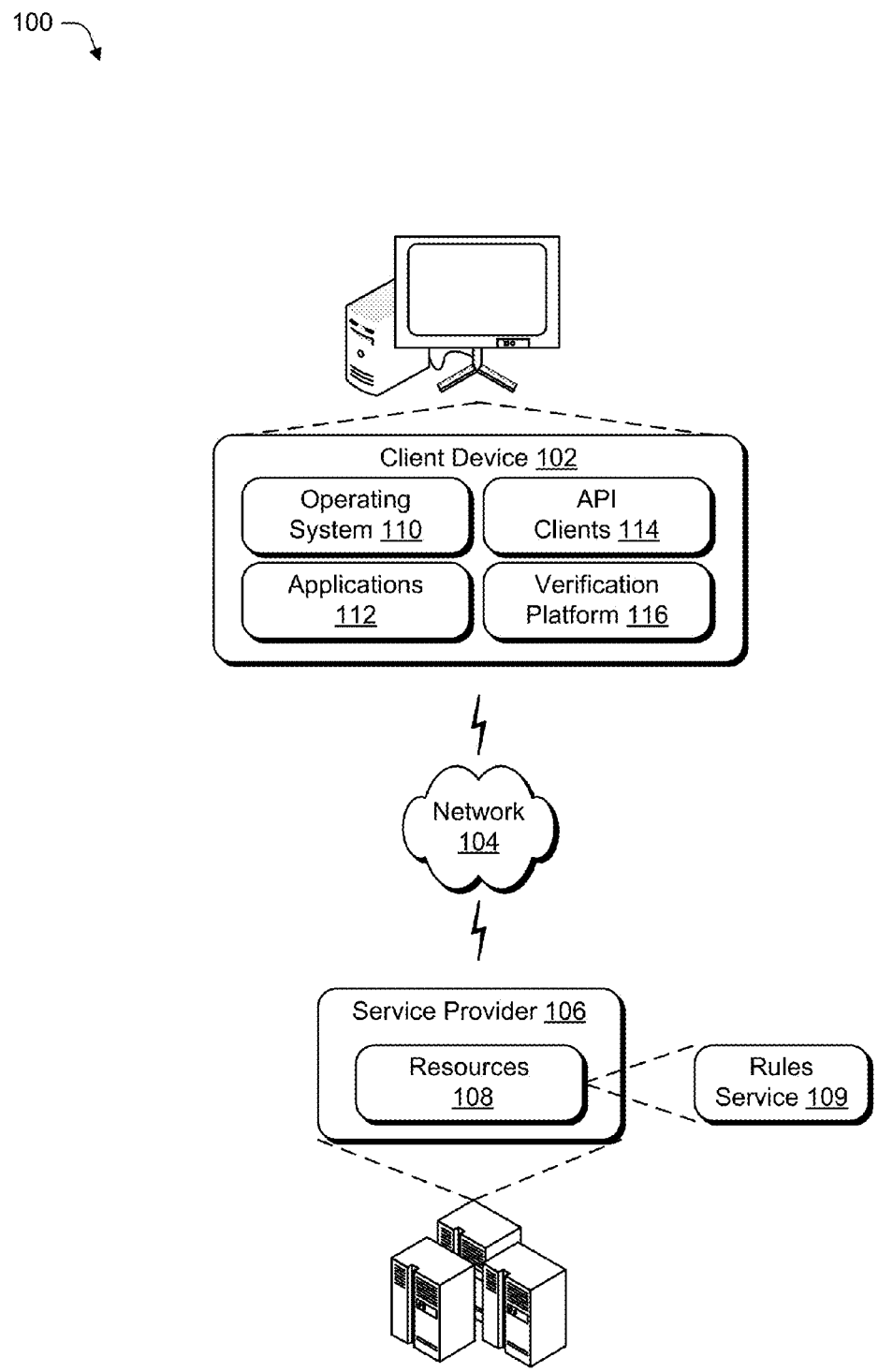
FIG. 1 is an illustration of an environment in accordance with one or more implementations of a stateful rules verification platform.

FIG. 1 is an illustration of an environment 100 in an example implementation that is operable to employ techniques described herein. The illustrated environment 100 includes a client device 102 that is communicatively coupled via a network 104 to a service provider 106. The service provider 106 may be configured to make various resources 108 (e.g. content and services) available over the network 104 to the client device 102 and other clients. Generally, resources 108 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources. Services may also include a rules service 109 as illustrated and/or database used to publish information regarding rules for use by various clients and enable access to rules information over the network 104 that clients may utilize to document and/or understand behaviors/bugs detected in relation to verifications, as discussed in detail below. Content may include various combinations of text, multi-media streams, documents, application files, photos, audio/video files animations, images, web pages, web applications, device applications, content for display by a browser or other client application, and the like.

The client device 102 and service provider 106 may be implemented by one or more computing devices and also may be representative of one or more entities. A computing device may be configured in a variety of ways. For example, a computing device may be configured as a computer that is capable of communicating over the network, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized by the service provider 106.

The client device 102 is further illustrated as including an operating system 110. The operating system 110 is configured to abstract underlying functionality of underlying hardware to applications 112 that are executable on the client device 102. For example, the operating system 110 may abstract processing, memory, network, and/or display functionality such that the applications 112 may be written without knowing "how" this underlying functionality is implemented. The applications 112, for instance, may provide data to the operating system 110 to be rendered and displayed by a display device without understanding how this rendering will be performed. Interaction of applications 112 with the operating system 110 may occur by way of one or more application programming interfaces (APIs) associated with the operating system 110. In this regard, the operating system 110 is one example of an API provider as discussed herein.

In accordance with techniques described herein, the client device 102 is also illustrated as including API clients 114 and a verification platform 116 that represents functionality operable to test performance of the API clients 114 against a set of verification rules. The verification rules may include stateful rules defined in accordance with a suitable specification language as described above and below. In some implementations, the verification platform 116 may be provided as an operating system component, however, the verification platform 116 may also be implemented as a standalone component as illustrated.

The verification platform 116 facilitates verification of target systems composed of a central module that provides application programming interfaces (APIs), e.g., an "API provider", for use by other application modules, e.g., "API clients," to take advantage of functionality provided by the central module. In one approach, the techniques described herein may be applied to device drivers, system drivers, and services that interact with system APIs provided by an operating system. Other kinds of target systems are also contemplated. Generally, the verification platform 116 may be configured in various ways to at least: (1) implement and/or otherwise make use of a suitable specification language to define rules, (2) provide rules defined in accordance with the specification language, (3) implement run-time verification using the rules, (4) enable static verification using the rules, and (5) facilitate publication and documentation of rules via a rules service or otherwise. Additionally, the verification platform 116 may be configured to support rules with timed state transitions that impose time limits upon some changes between states specified by the rules. Details regarding these and other aspects of a verification platform 116 suitable to implement stateful rules are described in relation in relation to the following figures.

Figure 2:
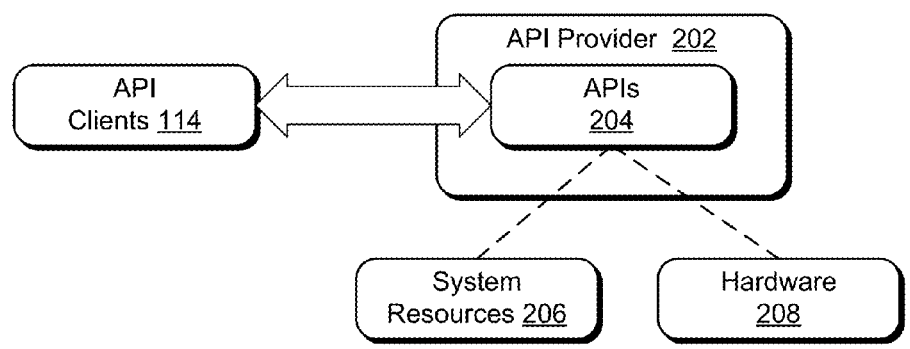
FIG. 2 is an illustration of an example target system for verification in accordance with one or more implementations.

FIG. 2 depicts an example representation of a target system 200 that may be the subject of verification by the verification platform 116. Here, API clients 114 are illustrated as interacting with an API provider 202 that includes various APIs 204. Generally, the APIs 204 provide abstractions of underlying system resources 206 and hardware 208 that are exposed to the API clients 114. In the example of an operating system 110, APIs 204 may be provided by the OS kernel to enable various API clients 114 to "plug-in" to core functionality of the OS (e.g., memory, CPU time, interrupts, device registers, communication protocols, system services, tools, functions, etc.) and implement extensions to the OS supported by the APIs. Other API providers 202 that provide corresponding APIs 204 for access to different types of functionality are also contemplated such as, by way of example and not limitation, a printer subsystem, a graphics rendering system, a wireless communication system, a sensor control system, and/or micro-processing subsystem that operates independently of the OS, to name a few examples. In this context, the API clients 114 are representative of various kinds of application modules, plugins, drivers (e.g., device drivers, printer drivers, graphics drivers, software drivers, class drivers, system drivers, etc.) and/or other third-party programs that are designed to interact with the OS or another central module through APIs 204.

Having considered the foregoing discussion of an example operating environment, consider now details regarding a verification platform described in relation to the following example illustrations and procedures.

Verification Platform Details

This section discusses details of an example verification platform in accordance with one or more implementations. In portions of the following discussion reference may be made to the example operating environment described in relation to FIGS. 1 and 2.

In particular, FIG. 3 depicts generally at 300 an illustration of an example verification platform 116 that may be implemented by a suitably configured client device 102. As mentioned, the verification platform 116 may be configured in various ways to at least: (1) implement and/or otherwise make use of a suitable specification language to define rules, (2) provide rules defined in accordance with the specification language, (3) implement run-time verification using the rules, (4) enable static verification using the rules, and (5) facilitate publication and documentation of rules via a rules service or otherwise. In accordance with techniques described above and below, the verification platform 116 is depicted in FIG. 3 as including or making use of a rules specification language 302 to define rules and stateful rules 304 that may defined in accordance with the rules specification language 302. At least some stateful rules 304 may be defined to employ timed state transitions 305 to impose time limits upon corresponding changes in state, details of which are described in a section below titled "Timed State Transitions." The verification platform 116 further includes a run-time verifier module 306 that may include an interceptor module 308 and a checker module 310 to perform run-time verifications using the stateful rules 304, a static verifier module 312 to implement static verification based on the stateful rules 304, and a documenter module 314 operable to publish information regarding rules and/or obtain information from a rules service 109 to document behaviors observed during verifications. Details regarding configuration and operation of each of these components of the verification platform 116 are discussed in turn below.

Rules Specification Language

The rules specification language 302 or "SL" is implemented to define rules for verification in a consistent and formal manner. In one particular example, the rules specification language 302 comprises SLIC (Specification Language for Interface Checking), although various language having characteristics described herein are also contemplated. In general, a suitable SL is configured to express rules in relation to interactions of API clients with API providers in various ways. In one approach, the SL may be employed to define rules in terms of state transitions for elements of interest in the target system. In other words, the rules may be expressed as transitions that occur for state machines associated with API interactions. In this respect, the SL may encode expected behaviors for API clients with API providers in relation to various API interactions as rules that can be checked for compliance and/or violation during verification. Various state transitions for elements may occur in response to different events. The SL may be employed to define rules to confirm that a client uses an API correctly and/or rules to determine that an API behaves correctly in response to a call from a client.

In addition to tracking of state transitions, the SL provides constructs (e.g., designated fields, protocols, descriptors, tags, identifiers, data structures, strings, coding rules, etc.) to handle objects, parameters, and values that may inform particular rules checks. This may include function or procedure arguments used to verify particular conditions, such as filename to check that a particular file is the subject of an interaction, a token indicative of authorizations, an identifier of an application or subroutine, a parameter indicative of a device or file status, and other arguments. This may further include life-cycle objects that persist along multiple API calls from a client into a provider or multiple entries (calls) into a client from a provider. Some examples of life-cycle objects include but are not limited to device objects (data structures to represent devices), miniport objects (data structures to represent miniport drivers), NDIS objects and so forth. The SL enables rules to reference and make use of such arguments and/or life-cycle objects.

In operation, the verification module 116 may manage the arguments and/or life-cycle objects in a cache or designated memory location. Objects to reference and manage various items may be created as needed and may be destroyed or otherwise discarded after use. The platform also supports requests to track state data flow/transitions on various objects for the purpose of verifying rule compliance. The SL may also be employed to specify responsive actions to be taken upon detected misbehaviors, such as suspending the run, triggering a notification, accessing a rules service for documentation, writing data to a bug file and so forth. Additionally, the SL may specify reset points that indicate when objects are to be reset individually and/or circumstances in which to reset the verification process/run as a whole.

Further, the SL also provides constructs to enable rules documentation. This may include comment fields and descriptor codes used to provide descriptions and comments regarding rules as part of the rule definition. These comment fields and descriptor codes may be extracted and used to facilitate publishing of rules in a manner that enables developers to understand the rules in plain terms. Thus, the SL implements a formalized description and comment structure for rules. Moreover, rules that are published (such as via a rules service 109 or otherwise) may be accessible to document behaviors observed during verifications. For instance, a description and/or comments associated with a given rule may be extracted from the rule and added to a notification that is provided when a violation of the rule is detected. In another approach, links to information regarding rules maintained by the rules service 109 may be included with notifications, messages, or entries formed in response to misbehavior detection with respect to the rules. Details regarding stateful rules and some illustrative examples are discussed in the following section.

Stateful Rules

The stateful rules 304 are defined in accordance with a rules specification language 302 as just described. The rules may reflect formal partial specifications of distinct meaningful combinations (subsets) of APIs exposed by an API provider to API clients. The rules are configured to provide unambiguous definitions of the interface contract between a provider and its clients. The rules definitions may be partial, in a sense that they define some selected aspects of API usage that are considered appropriate for verification and may forego other aspects (taking into account availability of computational resources and other practical constraints of real life, such as time-to-market, cost, etc.).

As mentioned, the stateful rules 304 may be defined in terms of state transitions for elements of interest in the target system. In other words, the rules may be expressed as transitions that occur for state machines associated with API interactions. In this respect, rules may be considered "stateful" as the rules are based upon checking that transitions of the state machines to different states occur as expected (e.g., in accordance with the rule definition). Some rules may implement timed state transitions 305 as discussed above and below.

To further illustrate, consider now a few examples of stateful rules. In one example, a rule may be defined for behaviors related to acquiring and releasing spinlocks by a driver. In particular, a rule may define that a thread holding a spinlock is prevented from acquiring the same spinlock again. Another rule may indicate that a driver is restricted from holding any spinlock when calling into another driver. Still further, another rule may indicate that a driver is restricted from holding any spinlock when returning from a driver callback function. Additionally, rules may also indicate that a driver has to acquire the lock before it may be released. Similar rules may be defined to monitor states in relation to memory access, operation of a miniport driver for connection/disconnections, device interactions, and so forth. One illustrative example of code for a rule definition written in accordance with a suitable specification language (e.g., SLIC in this example) is as follows:

```
Rule Name:
    SpinLock
Rule Namespace:
    Namespace_Name
Rule ID:
    0x00040009
Description:
    This rule verifies that calls to KeAcquireSpinLock or
    KeAcquireSpinLockRaiseToDpc and KeReleaseSpinlock are used in
    strict alternation. Moreover, at the end of the dispatch or
    cancel routine driver should not hold the spinlock.
Help Link:
    http://go.path.com/fwlink/?LinkId=216061
*/
#include "slic_base.h"
state{
    enum {initial,locked} s = initial;
}
watch KeAcquireSpinLock.entry.$1;
[KeAcquireSpinLock,KfAcquireSpinLock,KeAcquireSpinLockAtDpcL
evel].entry[guard $1]
{
        if (s == locked) {
            abort "The driver is calling $fname after already acquiring
the spinlock.";
        } else {
            s = locked;
        }
}
[KeReleaseSpinLock,KfReleaseSpinLock,KeReleaseSpinLockFromDpc
Level].entry[guard $1]
{
        if (s != locked) {
            abort "The driver is calling $fname without first acquiring
the spinlock.";
```

-continued

```
        } else {
            s = initial;
            halt "XDV_CLEAN_STATE";
        }
}
[SDV_STANDARD_DRIVER_ROUTINES].exit
{
        if (s == locked) {
            abort "The dispatch routine has returned without releasing a
spinlock.";
        } else {
            halt;
        }
}
[SDV_SPECIAL_DRIVER_ROUTINES]@SDV.exit
{
        if (s == locked) {
            abort "The dispatch routine has returned without releasing a
spinlock.";
        } else {
            halt;
        }
}
```

The foregoing example rule relates to spinlock and includes information such as the rule name, namespace, and a rule identifier. A description field portion is also included that provides comments/description to indicate that the rule enforces certain state conditions for calls to corresponding APIs for acquisition and release of the spinlock. The rule definition also includes a help link that as discussed herein may be used to facilitate publishing and documentation of the rule. The example rule specifies values and transitions for a state machine represented by the state variable "s". A variety of other rules related to drivers as well as other kinds of API clients are also contemplated.

Run-Time Verifier

The run-time verifier module 306 represents functionality operable to perform run-time verifications based on stateful rules 304. This may involve operations to intercept calls made to designated APIs and automatic generation of run-time code to implement verification checks for rules implicated by the intercepted calls. In an implementation, the run-time verifier module 306 includes an interceptor module 308 and checker module 310. The interceptor module 308 is operable to intercept both calls to APIs issued by clients and calls to a client's procedures (callbacks, entry points, etc.) from a provider and initiate creation of corresponding verification checks based on the interceptions. For instance, the interceptor module 308 may invoke the checker module 310 with the intercepted calls to cause the interceptor module to set-up and apply various checks corresponding to the calls.

In particular, the checker module 310 may analyze the intercepted calls to identify any stateful rules 304 that apply to the calls. The checker module 310 may retrieve definitions for the applicable rules that are written using the rules specification language 302. The checker module 310 may use the rules definition to automatically generate corresponding verification checks to monitor expected behavior and determine compliance with the rules.

In particular, implementation code to perform the verification checks may be generated automatically from definitions of the stateful rules 304 that are retrieved by the checker module 310. The implementation code may be also be optimized through re-assembling state transitions in API rules, combining together transitions (from different rules) which are triggered by same events, and translating these combined transitions into an actual programming language (e.g., C, C++, etc.) for run-time implementation of the checks. Run-time code to implement verification checks may be produced dynamically in response to interception of calls or "offline" to produce pre-configured verification.

At run-time, the checker module 310 implements the checks derived from stateful rules 304 to verify that the system behaves as the rules prescribe. The run-time verification may be selectively turned on or off for a particular computing system or device. In some cases, a developer may enable the run-time verification for a code project on a test machine and/or in conjunction with code testing and/or debugging. Run-time verification may also be provided as an option to consumers that may be enabled on-demand for trouble shooting of APIs and clients related to an operating system 110 or other central module. When run-time verification is enabled for a regular run or a test run of a target system, the run-time verifier module 306 checks the entire system against a set of rules associated with the system. If misbehavior or non-compliance with one or more of the rules is detected the run-time verifier module 306 may take various responsive actions. Such responsive actions may be designated within the rules using the rules specification language 302 as noted above and may be encoded within the implementing code generated by the checker module 310. By way of example and not limitation, responsive actions that may be specified include breaking the testing run, issuing an error message, initiating documentation of misbehavior, writing an entry describing the misbehavior to a results file or database, bypassing an API associated with the misbehavior, activating a recovery process, and so forth.

In one approach, tracked states are bound to OS, kernel, framework, or other target system objects (e.g., a thread object, a miniport object, etc.). This makes the implementation of state transitions efficient, by narrowing the scope of locks used to guard state manipulations. The tracked state objects may be manipulated on an individual basis rather than by employing global databases.

In the case of tracked states bound to thread objects, the run-time verifier module 306 may be configured to handle thread preemption and resolve situations in which multiple instances of executing components may rely upon the same thread object. With respect to verification using stateful rules, the run-time verifier module 306 may implement an algorithm to ensure that a state actually belongs to execution of a subject driver/API client and not to another component using the same thread object. To do so, the run-time verifier module 306 may detect and ignore call interceptions for some high priority components running on a given thread object in certain cases considered either impossible or infeasible to deal with. For example, interceptions that run at a high interrupt request level may be ignored. In addition, interceptions for a thread may be ignored when the thread is currently used to run a Deferred Procedure Call (DPC). Additionally, the run-time verifier module 306 may detect when multiple instances of executing components of normal priority are bound to the same thread object and apply a stack-based technique to extract the state that belongs to a component that most recently preempted the thread. In this way, the run-time verifier module 306 is able to handle situations in which multiple instances of executing components may rely upon the same thread object.

Static Verifier

The static verifier module 312 represents functionality operable to perform static verifications based on stateful rules 304. In particular, the static verifier module 312 is a compile-time tool for inter-procedural static analysis of an API client's source code. Given source code of a client, the static verifier module 312 may operate to verify that each execution path from the client's entry point through the client's exit obeys the stateful rules 304. Static verification may be employed in some scenarios to provide exhaustive verification of each execution path. Additionally, static analysis may occur without significant set-up costs or creation of test benches/test cases.

Notably, the static verifier module 312 may be configured to employ the same rules as the run-time verifier 306 in the same format and written using the same rules specification language 302. This is in contrast to traditional models that employ entirely separate rules, systems, and techniques for run-time verification and static verification, and which therefore can be inefficient, resource intensive, and difficult for developers to utilize and maintain. Here, the static verifier module 312 may re-use stateful rules 304 created for run-time verification without modification. In an implementation, the static verifier module 312 may include a checker component comparable to the checker module 310 that can interpret an API client's source code to determine rules implicated by various calls. The checker component may then derive implementing checks for static analysis from the rules definitions and apply the checks during static verification runs. Accordingly, the verification platform 116 is designed to facilitate both run-time verification and static verification using a common rules specification language 302 and/or the same set of stateful rules 304.

Documenter

The documenter module 314 is representative of functionality to facilitate publishing and/or documentation of stateful rules 304. Publishing and documentation of rules may occur in various ways. As mentioned, stateful rules 304 may be published via a rules service 109 of a service provider 106 or otherwise. Publication of the stateful rules 304 enables API client developers to understand how to use APIs correct (e.g., in accordance with the rules) and therefore to develop code that respects the interface contract with the API provider. In a rules creation setting, the documenter module 314 or comparable functionality may be operable to interact with a rule service 109 to publish rules descriptions and/or definitions for access by code developers and/or consumers. The formal specification of rules via the rules specification language 302 enables the developers and/or consumers to access information regarding rules in a consistent and understandable format. Developers may also be able to produce new rules to extend the verification platform 116 with new checks.

As mentioned, formalized description and comments may be included as part of the rules definition. This information may be extracted and used to publish the rules with a service or otherwise. In a static or run-time verification setting, the published rules information and/or links to the rules may also be employed to document observed behaviors/misbehaviors. For instance, rules definitions may contain data to facilitate linking to relevant comments and documentation published via a rules service 109. The run-time verifier module 306 and the static verifier module 312 may utilize the links to comments and documentation to incorporate or include references to relevant comments and documentation for rules in responses (e.g., warnings, messages, notifications, entries, etc.) generated when misbehavior is detected during verification with respect to one or more rules.

Example Procedures

Figure 4:
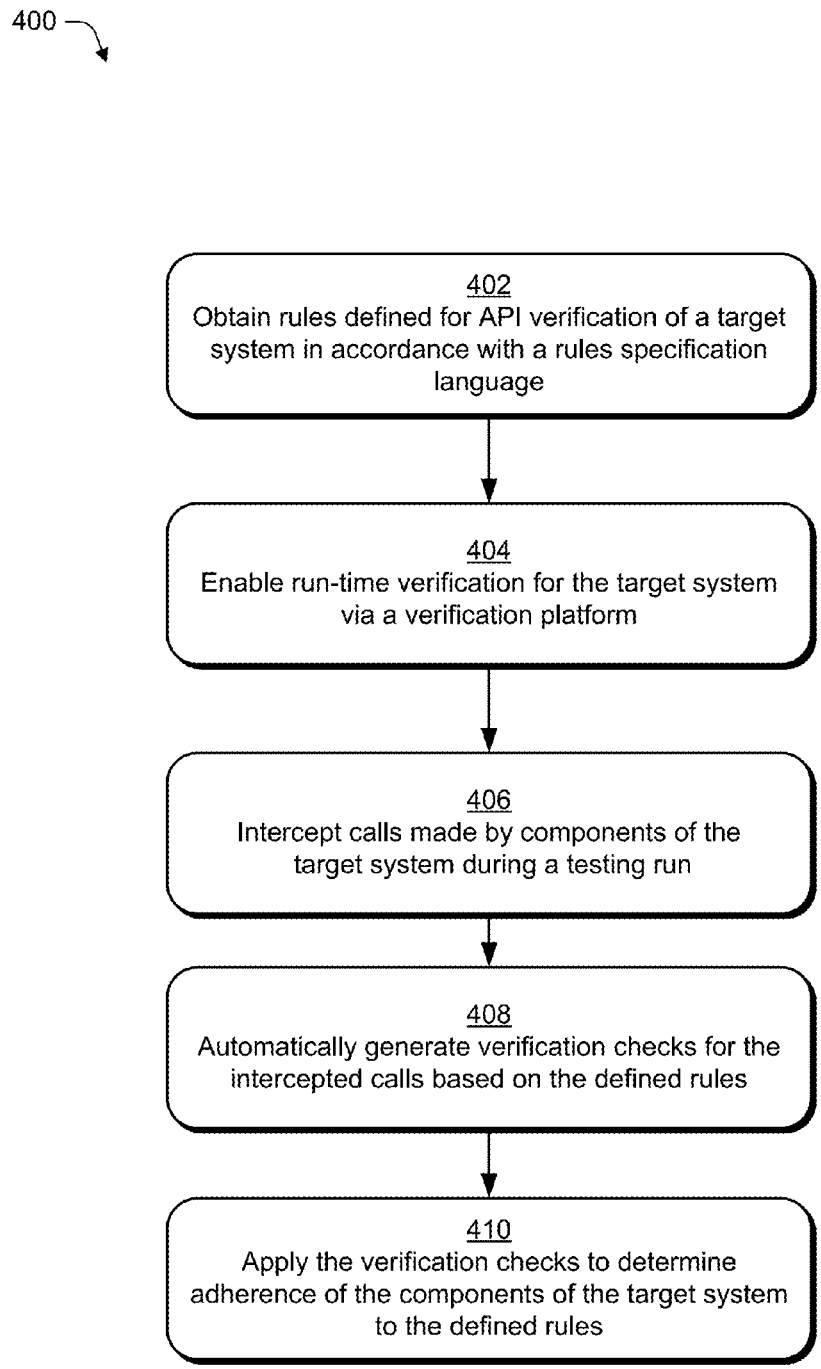
FIG. 4 is a flow diagram depicting an example procedure in which run-time verification is performed.
Figure 5:
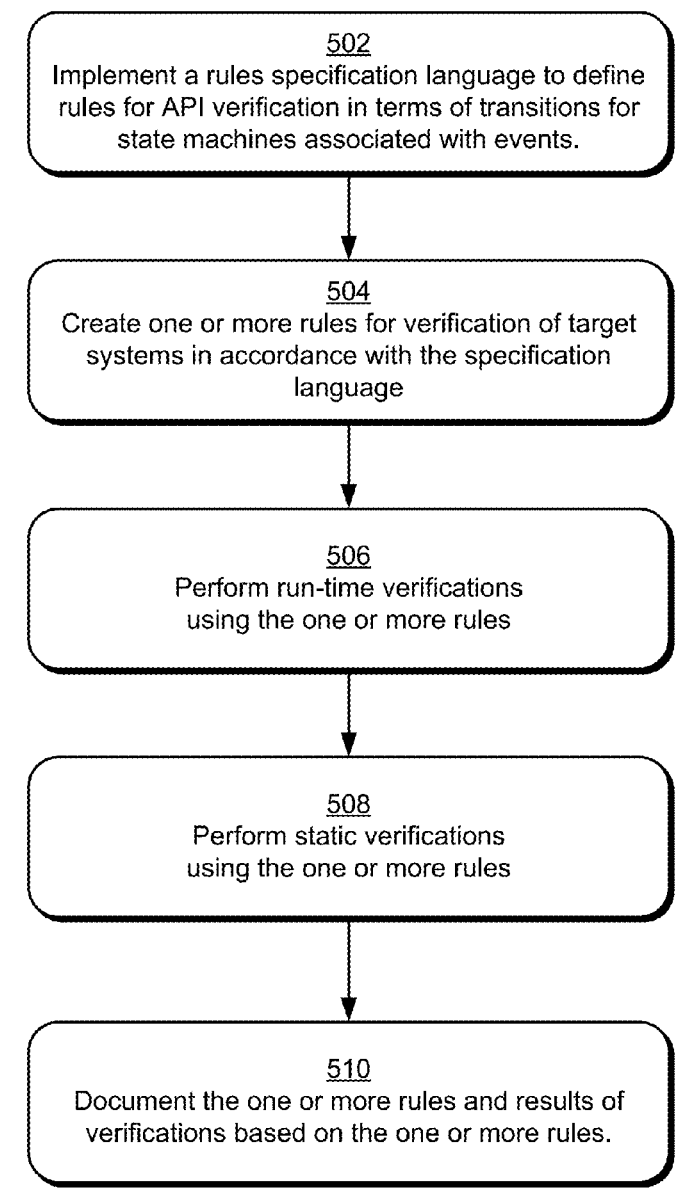
FIG. 5 is a flow diagram depicting an example procedure in which a verification platform operates to employ stateful rules for code verifications.

This section discusses details of techniques for a stateful rules verification platform with reference to example procedures of FIGS. 4 and 5. In portions of the following discussion reference may be made to the example operating environment of FIG. 1 in which various aspects may be implemented. Aspects of each of the procedures described below may be implemented in hardware, firmware, or software, or a combination thereof. The procedures are shown as a set of blocks that specify operations performed by one or more devices and are not necessarily limited to the orders shown for performing the operations by the respective blocks. In at least some implementation the procedures may be performed by a suitably configured computing device, such as the example client device 102 of FIG. 1 that includes or makes use of a verification platform 116 or comparable functionality.

FIG. 4 is a flow diagram depicting an example procedure 400 in which run-time verification is performed. Rules defined for API verification of a target system in accordance with a rules specification language are obtained (block 402). For example, a verification platform 116 as described herein may be encoded with stateful rules 304 defined in accordance with a rules specification language 302. The verification platform 116 may be pre-configured to include various rules. The verification platform 116 may also be configured to interact with a rules service 109 to obtain rules associated with different types of clients and providers and/or updates to rules that may occur from time to time. In connection with run-time verification, rules associated with a particular target system may be obtained and supplied for use by a run-time verifier module 306 configured to use the rules to check behaviors of API clients and API providers.

Run-time verification is enabled for verification of the target system via the verification platform (block 404). For example, the verification platform 116 may include a run-time verifier module 306 that is configured and operates in the manner previously described. The run-time verifier module 306 may be selectively enabled on-demand to perform run-time verifications. In other words, a developer, consumer, or other user may toggle functionality represented by the run-time verifier module 306 to selectively perform verifications for code testing, troubleshooting, and so forth.

Calls made by components of the system are intercepted during a testing run (block 406). For instance, an interceptor module 308 as described above or comparable functionality may operate to intercept calls made into APIs as well as callbacks made by an API provider to clients. Then, verification checks are automatically generated for the intercepted calls based on the defined rules (block 408) and the verification checks are applied to determine adherence of the components of the target system to the defined rules (block 410). Here, the an interceptor module 308, in response to intercepted calls may invoke a checker module 310 as described above or comparable functionality to process the intercepted calls and create corresponding verification checks. This may occur in the manner discussed in relation to FIG. 3. To briefly reiterate, though, the checker module 310 may determine stateful rules 304 that are implicated by or otherwise associated with the intercepted calls and derive checks based on the applicable rules. The checks may be derived directly from the rules definitions. This may involve generating and injecting implementing run-time code for performance of the checks into the target system based on rules definitions.

In addition or alternatively, verification checks may be generated in advance by a standalone generation module or by comparable functionality incorporated with the checker module 310 and/or verification platform 116. This may involve deriving the verification checks from the rules as discussed herein outside of verification runs. In other words, verification checks may be pre-configured "offline" prior to a verification run and encoded within the system for subsequent use by the run-time verifier module 306 and/or static verifier module 312. For instance, the pre-configured verification checks may be encoded within a checker module, stored in a location accessible by a checker module, or otherwise made available for use by the verification platform during testing. When a verification run occurs, the checker module may intercept various calls and perform a look-up to match the calls to corresponding verification checks that are pre-configured. Thus, verification checks that match the actual calls that are intercepted are identified and applied to verify adherence of the target system to corresponding rules (e.g., rules from which the pre-configured verification checks are derived).

The checker module 310 further operates to apply the checks to test for misbehaviors and bugs. In the case that one or more rules are broken, the checker module 310 may be configured to take responsive action designated by the rules, some examples of which were previously discussed. In the event that no misbehaviors or bugs are detected, the checker module 310 may continue operation until disabled, timed-out, or the verification is otherwise concluded. When verification is concluded, a report, message, or other notification may be output that may include an indication that no misbehaviors or bugs were detected, a summary of the testing, statistics, and/or other information regarding the verification.

FIG. 5 is a flow diagram depicting an example procedure 500 in which a verification platform operates to employ stateful rules for code verifications. The procedure represents operations that may be implemented by a suitably configured verification platform, such as the example verification platform 116 and corresponding components depicted and described in relation to FIGS. 1 and 3. The verification platform 116 may be stored on some form of computer-readable media as described herein and/or may be implemented at least partially by hardware, such as via a processing system and/or hardware elements of a computing device.

A rules specification language is implemented to define rules for API verification in terms of transitions for state machines associated with events (block 502). For example, a verification platform 116 as described herein may include or otherwise make use of a rules specification language 302 to provide a formal specification of rules for verifications. One or more rules are created for verification of target systems in accordance with the specification language (block 504). In particular, the rules specification language 302 may be used to create stateful rules 304 and associate the rules with a target system. The target system may include an API provider 202 that exposes APIs 204 to API clients 114. In one particular example, the target system comprises an operating system 110 that makes various system APIs available to drivers to extend operating system functionality. In one approach, a set of rules may be created for a particular target system. Thus, different sets of rules may be associated with different target system and/or with particular types of APIs and API clients. In some scenarios, though, particular rules may be applied across different systems, re-used, and/or re-purposed to define similar expected behaviors for different calls or APIs.

Run-time verifications are performed using the one or more rules (block 506) and static verifications are performed using the one or more rules (block 508). The run-time verifications and static verifications may be implemented by a run-time verifier module 306 and static verifier module 312, respectively, in the various ways already discussed herein. Stateful rules 304 created for the verification platform 116 in relation to a particular target system may be used for both run-time verifications and static verifications of the target system. Accordingly, development and maintenance of separate rules and/or platforms for run-time verifications and static verifications may be avoided. Stateful rules 304 described herein may be employed for both types of verifications without having to make modifications to the rules or the specification language used to describe the rules.

The one or more rules and results of verifications based on the one or more rules are documented (block 510). For example, a documenter module 314 or other comparable component of the verification platform may be provided to facilitate publishing or rules and/or descriptions of the rules in the manner described herein. In one approach, a service provider 106 may expose a rules service 109 to manage rules, provide a location to publish rules, enable access to the rules, and so forth. The documenter module 314 may also be operable to access and make use of information regarding the rules to document the results of verification runs. This may involve acquiring and adding descriptions and/or comments associated with rules to reports, warning, notifications, messages, and/or other instruments configured to provide information regarding the results of verification runs. For instance, when misbehavior is detected with respect to a particular rule a warning message may be generated and output to alert a user regarding the misbehavior. The documenter module 314 may operate to retrieve descriptions and/or comments associated with the particular rule and cause the warning message to incorporate the descriptions and/or comments for the particular rule to enable a developer/user to more fully appreciate the misbehavior.

Timed State Transitions

In the context of the forgoing description of a stateful rules verification platform, this section describes details regarding an extension of the verification platform to support rules that employ timed state transitions to impose time limits upon transitions indicated by the rules. The timed state transitions may be designed to detect situations (e.g., bugs or misbehavior) in which the system hangs or otherwise fails to reach an expected state (e.g., for a finite state machine (FSM) associated with a rule) within a prescribed amount of time. Timed state transitions may be employed to address hangs and other computer system bugs that may otherwise be difficult or impossible to detect. For instance, system hangs may be caused by various reasons examples of which include software bugs such as deadlock or race conditions, hardware bugs such as command queue overflow or performance failures, and/or a software/hardware interface bug caused by complex inconsistency between software and hardware behaviors. Since a hang can manifest in a wide variety of symptoms, root-causes of hang (and similar bugs) may be difficult to ascertain.

Accordingly, the verification platform 116 described previously may be extended to enable definition and use of stateful rules that impose time limits upon transitions between states specific by the rules. This includes providing constructs within the rules specification language 302 to support creation of stateful rules 304 with timed state transitions 305. Additionally, the runtime verifier 306 may be adapted to recognize and apply the timed state transitions 305 during run-time verifications. The general notion implemented by way of the timed state transitions 305 described herein is that designated state transitions defined by the stateful rules 304 are to be completed within a given time limit to be considered successful. Timed state transitions 305 facilitate testing of the timing for critical operations in addition to testing the logic of state machines to which stateful rules 304 are applied. Faults or misbehavior can therefore be defined/detected for interactions between an API client 114 and API provider 202 if the interactions do not occur in a timely manner.

A timed state transition 305 is a state transition to be completed within a given time limit, thus imposed on the corresponding transition. State transitions of interest include those that are specified in API rules between states that occur in response to certain events. The events relate to and mark calls into APIs 204 from an API client 114 and/or callbacks from an API provider 202 into client code (e.g., entry into or exit from the code). Time limits imposed on state transitions by way of timed state transition 305 may be bound to such events that are specified API rules in the manner described herein.

In particular, to support timed state transition 305, the rules specification language 302 to formalize API rules is extended with constructs to constrain API rule state transitions with designated time limits. The constructs may include various designated fields, protocols, descriptors, tags, identifiers, data structures, strings, coding rules, parameters, objects, variables, and so forth suitable to associate time limits with some stateful rules. By way of example and not limitation, the rules specification language 302 may be configured to use both explicit and/or implicit techniques, details of which are described in turn below.

For the explicit technique, a time limit L is specified at the transition source state A (e.g., initial or starting state) for the transition to a destination state B associated with a responsive action or reaction R. This may expressed as follows:

$$\text{timelimit } A \rightarrow B: L \text{ with reaction } R$$

Here, the destination state B is to be reached from source state A in no longer than L time units. In other words, when A is reached, a logical timer designated for this particular transition is initialized and starts to track timing for an associated transition. The timer may also be charged to fire an event at the time limit L to initiate a designated reaction R. Various different timers and timing techniques are contemplated, details of which are discussed later in this section. The timer may be stopped, discharged, and/or cleared if the destination state B is reached before the time limit L is exhausted. Otherwise, if the time limit L is exhausted before the destination state B is reached from state A, the timer fires the event to trigger a corresponding reaction R. One simple example of a reaction is a bug check break of the system execution. Other types of responsive actions including the examples discussed previously herein may also be specified. Accordingly, the constructs to implement the timed state transitions 305 may enable explicit definition of a time limit to associate with a transition from a source state to a destination state.

For the implicit method, a timed API rule is augmented with timer constructs that specify the reaction R and a timer condition(s) upon which R is triggered. The timer condition is a condition placed on attributes of a rule state machine, as with a normal stateful rule, with the following extension. The rule state structure is augmented with a timing attribute associated with state A (e.g., the source state), which may be added as an additional timing attribute, for example, T. The additional timing attribute may be configured to store a timestamp associated with the source state. When state A is reached, a construct timestamp (e.g., a timer function) is used to capture the current time stamp and save it by way of the timing attribute T, as represented by the following expression:

T=timestamp.

The same construct (or another construct) may be used in the timer condition, to regularly check that a difference between a saved time stamp T and the current time stamp does not exceed the time limit L, which may be expressed as follows:

$$timestamp - T > L$$

The above expression represents a comparison at a given time between the stored time for the initial state A and the current time in relation to the time limit L. If the limit L is exceeded, this may cause a corresponding reaction R to occur. Thus, the expression below represents the timer construct in the implicit implementation:

$$timer \{if (timestamp - T > L) \{R;\}\}$$

A rule may specify that if the destination state B is reached before the condition is true (thus triggering reaction R) then the saved time stamp T is cleared, which in turn makes the timer condition no longer applicable.

In an implementation, predictive evaluation timing technique is employed in which the rule specification language 302 is further configured to include within a timed stateful rule an indication of when to evaluate the timing expression. The indication operates as a prediction of when to make an assessment about the corresponding timing of the rule. By so doing, situations in which timing is evaluated too frequently at the expense of computing resource consumption may be avoided. Additionally, the predictive evaluation timing technique may also avoid inaccurate timing results that may be caused by evaluating the timing expression too infrequently. The indication may be configured in various ways. For example, a parameter or constant value included in a rule definition may specify an evaluation interval which the timing expression is evaluated such as every two, five, or ten seconds at. In another approach a factor of the time limit L may be applied to define the evaluation interval. For example, for a time limit of five seconds, a one half factor may cause evaluation every two and one-half seconds (e.g., one half or five seconds) whereas a factor of one causes evaluation every five seconds, and forth. The factor may produce different evaluation intervals for different rules.

In addition to modifying the rules specification language 302 to support/define timed state transitions 305 in the manner just described, the run-time verifier 306 may be adapted to recognize and handle timed state transitions defined by rules. Generally, the run-time verifier 306 may interpret rules to generate corresponding checks as previously described. In the case of timed state transitions, the run-time verifier 306 and in particular the checker module 310 may set-up and initialize appropriate timers and timer conditions in response to detection of a rule that makes uses of timed state transitions. Then, verification checks may be derived and verifications may be performed substantially in the manner previously described with the additional constraint of time limits being placed upon certain interactions by corresponding rules and verification checks derived therefrom.

Generally, any suitable timers and timing techniques may be used to implement timed state transitions 305. In one or more implementations, a system timer may be employed. In addition or alternatively, other dedicated timers and timer optimizations may be employed to provide more sophisticated timing techniques for some scenarios.

In the case of preemptive scheduling, where a low priority thread can be preempted by a higher priority thread, it is possible that a low priority thread will be unable to run for a long period of time based on priority. This long period of inactivity may potentially be misinterpreted as a hang. To handle such situations, a passive timing approach may be implemented. To do so, threads for timers used to evaluate timed state transitions may be assigned a lowest thread priority available in connection with the operating system/processing system. Accordingly, the timer will not be able to run if other relatively low priority threads are also unable to run because of the system load/stress. The non-running of the timer may be detected and mapped back to priority issues, which can prevent the misrecognition of such situations as hangs.

Further, direct use of a system timer may be inadequate in some cases for a number of reasons. First, threads may be suspended for priority or other reasons while the absolute timer continues to increment. This may cause misrecognition of hangs as discussed above. Additionally, threads may also be suspended when system execution is paused (e.g., for a debugger breakpoint or otherwise) as the absolute timer again continues to increment. This may potentially make the debugging experience impractical and/or ineffective for timed rules. In other words, after a debugger breakpoint occurs, a timed rule may trigger an indication of misbehavior if timing is based on the system timer alone because the break is too long (e.g., too many seconds). A relative timing approach may be implemented to handle such situations. In the relative timing approach, local timers that run independently of the system timer are employed for the timed state transitions. The local timers are configured to increment when corresponding threads are allocated processing resources and stop when a corresponding thread is suspended. For example, individual local time timers may be generated for each stateful rule upon which a time constraint is imposed. These local timers may be started when a corresponding process is started (e.g., resources are allocated to the thread) and stopped when the process is suspended (e.g., the thread is suspended) for priority, a debugging break, or otherwise. Accordingly, the actual amount of time it takes to complete associated tasks may be accurately monitored.

In addition or alternatively, timer constructs may be further extended to implement a periodic time interval for directing checks of timer conditions for one or multiple individual local timers associated with different rules. In particular, timer conditions may be checked at the end of a designated and/or configurable interval. Using the periodic time interval enables control over the accuracy and performance impact of timed stateful rules. In an implementation, a global timer is maintained for the system and implements an evaluation interval for determining when to evaluate timing for timed state transitions. Individual local timers may also be associated with each rule/timed state transition. The local timers may be implemented as simple time counters or otherwise. Thus, evaluation of the local timers may occur according to an evaluation interval controlled by the global timer. For example, at the periodic interval specified by the global timer, local timers are updated based on the current time. A check is then made for local timers that have reached the end of the time limit set by a corresponding rule. Corresponding responsive actions may then be taken for state transitions that have exceeded the time limits. The periodic time interval technique may improve performance by reducing the computing resources employed to search for state transitions that exhaust time limits.

Additional details related to timed state transitions are now discussed with reference to the following example procedures of FIGS. 6 and 7. In at least some implementations the procedures may be performed by a suitably configured computing device, such as the example client device 102 of FIG. 1 that includes or makes use of a verification platform 116 or comparable functionality. The verification platform 116, for instance, may be adapted to implement timed state transitions for at least some stateful rules.

Figure 6:
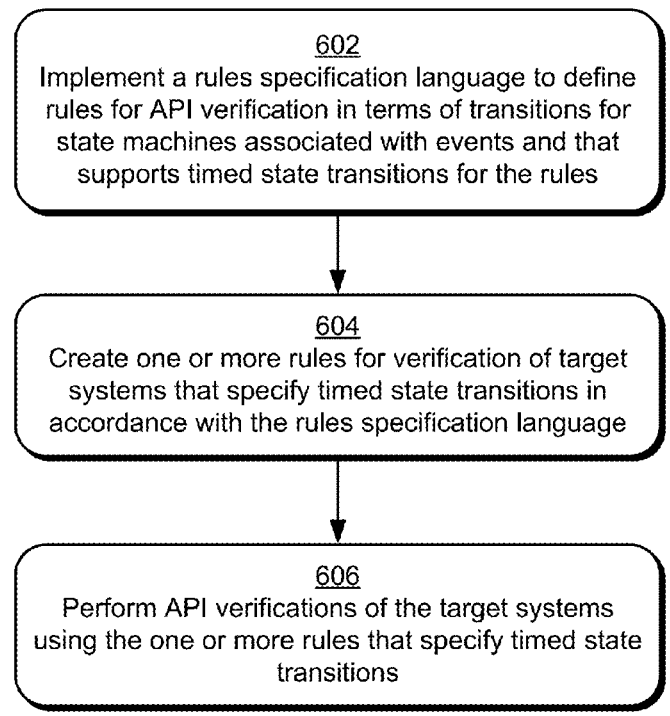
FIG. 6 is a flow diagram depicting an example procedure in which a verification platform implements stateful rules with timed state transitions for code verifications.

In particular, FIG. 6 depicts an example procedure 600 in which a verification platform implements stateful rules with timed state transitions for code verifications. A rules specification language is implemented to define rules for API verification in terms of transitions for state machines associated with events and that supports timed state transitions for the rules (block 602) and one or more rules for verification of target systems are created that specify timed state transitions in accordance with the specification language (block 604). For example, the rules specification language 302 may be adapted to include constructs to support timed state transitions 305 for stateful rules 304 in the manner described herein. The timed state transitions 305 may enable timing to be imposed upon changes in states (e.g., transitions) for finite state machines associated with drivers (or other API clients) and/or hardware. Thus, not only may the verification platform 116 track transitions between states, but also timing associated with the tracking. The rules may impose time limits/constraints on state transitions for critical operations. The system is then able to monitor conditions in which an API client executes slowly as well as failures to execute at all.

At least some time limits may be based upon protocols defined for interaction with particular hardware. Generally the time limits are hardware specific as well as interaction specific. For example, a write operation to a memory location may have a two second limit whereas connection to a network service may have a thirty second time limit for operations performed via the same driver/client. Naturally, different drivers/clients may also be associated with different limits for the same or similar tasks. The specification language is configured to enable encoding of such time limits within rules and facilitate evaluation of the timing specified by the rules during verification.

API verifications of the target systems are performed using the one or more rules that specify timed state transitions (block 606). In particular, the run-time verifier module 306 may be implemented to perform run-time verification of a target system using stateful rules 304. The stateful rules 304 may define at least some timed state transitions 305 as discussed herein. Thus, the run-time verifier module 306 may recognize timed state transitions 305 defined in accordance with the rules specification language 302 and apply the rules accordingly. This may involve instantiating and managing one or more timers for timed state transitions to track timing of interactions in target system and evaluating the timers to verify compliance with time constraints. The timer may include local timers and/or a global timer as discussed above. The run-time verifier module 306 may also take action in response to detection of an interaction exceeding a time limit, including but not limited documenting of the bug or misbehavior as discussed herein.

Figure 7:
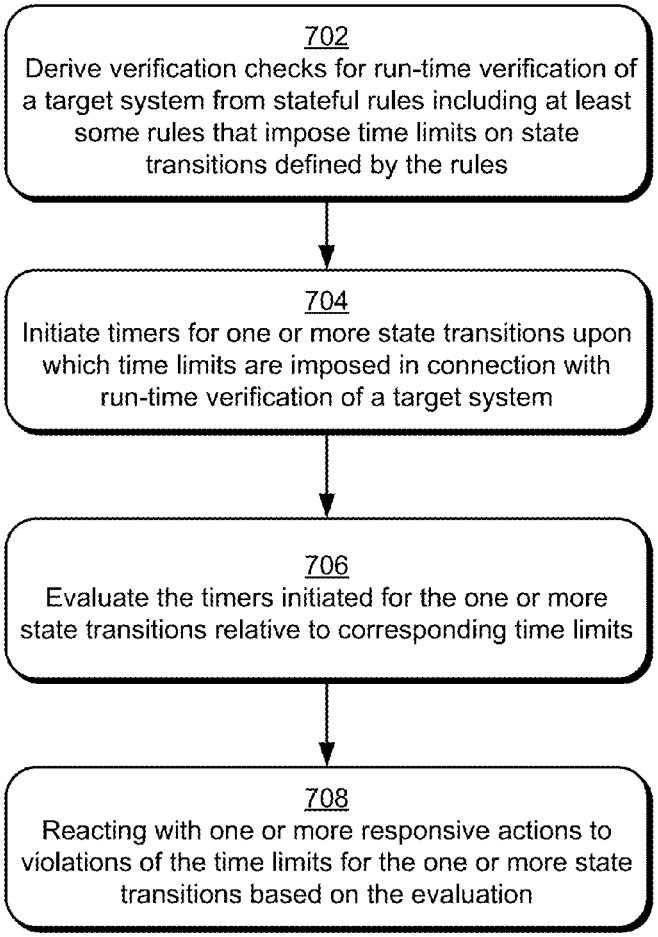
FIG. 7 is a flow diagram depicting an example procedure in which a verification platform operates to employ stateful rules for code verifications.

FIG. 7 depicts an example procedure 700 in which a verification platform operates to employ stateful rules for run-time code verifications. Verification checks for run-time verification of a target system are derived from stateful rules including at least some rules that impose time limits on transitions defined by the rules (block 702). Verification checks may be derived in various ways as described herein. For example, a checker module 310 may derive checks in response to interception of calls by an interceptor module 308. In addition or alternatively, the verification checks may be generated "offline" prior to a verification run (e.g., pre-configured checks) and encoded within the system for use by the run-time verifier module 306 at run-time. For rules that defining timing aspects, the checks may be configured to implement timing and evaluation of timed state transitions 305 using the various techniques discussed herein. For example, explicit or implicit techniques described above may be used to specify timed state transitions. Additionally, predictive evaluation timing techniques may be employed to designate an interval or otherwise encode an indication of when to evaluate timing specified within a rule.

Timers are initiated for one or more state transitions upon which time limits are imposed in connection with run-time verification of a target system (block 704) and the timers initiated for the one or more state transitions are evaluated relative to corresponding time limit (block 706). As mentioned, various timers and timing techniques suitable to monitor timing of particular transitions may be employed. For instance, timers may be associated with a system timer. Additionally, various optimizations described herein may be supported by the specification language and/or applied to implement timers and timing techniques. The optimizations may include but are not limited to a passive timing approach, a relative timing approach, and/or a periodic time interval as described above. Timers may be individually associated with each rule and/or a group timer may be associated with multiple rules. Additionally, a global timer may be employed to implement an evaluation interval to direct timing for evaluation of other timers. Thus, the timers may be evaluated at a designated interval, which may be a fixed or variable interval. The fixed or variable interval may be controlled via the global timer as discussed above and/or individually for particular local timers. Further, different evaluation intervals may be specified for different rules.

One or more responsive actions are implemented as a reaction to violations of the time limits for the one or more state transitions based on the evaluation (block 708). Here, specified responsive actions may be taken when a time limit is exceeded. This may include various responsive actions discussed previously, such as breaking the verification run, preparing a notification regarding the detected time limit violation, writing to a bug file or database record, failing execution of the API clients that violated one or more time limits, documenting the violation in various ways, starting an alternative or recovery execution process, and so forth. Violations of the time limits generally may be handled and documented in the same manner as other misbehaviors including the examples described throughout this document (e.g., misbehaviors/bugs discussed in relation to stateful rules that do not have timing constraints).

Having considered the foregoing example details and procedures, consider now a discussion of an example system and device to implement various aspects in accordance with one or more embodiments.

Example System and Device

Figure 8:
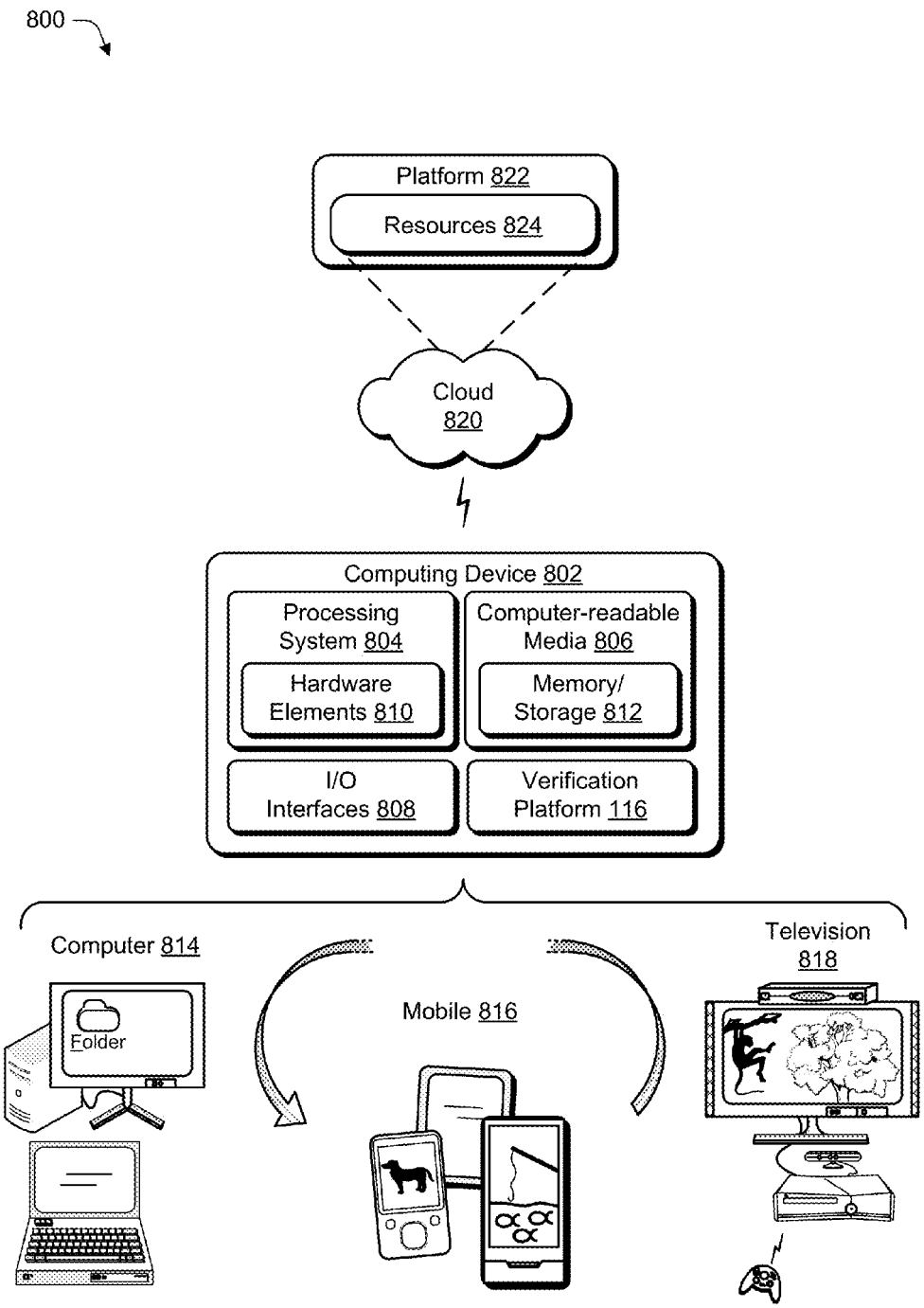
FIG. 8 depicts an example computing system in accordance with one or more embodiments.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command29 transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable media described previously.

Combinations of the foregoing may also be employed to implement various techniques and modules described herein. Accordingly, software, hardware, or program modules including operating system 110, applications 112, verification platform 116, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the verification platform 116 on the computing device 802. The functionality of the verification platform 116 and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing system including one or more computing devices comprising: one or more processing systems; and one or more computer-readable storage media storing instructions executable by the one or more processing systems to implement: a target system for verification including an application programming interface (API) provider that exposes one or more APIs and one or more API clients that use the APIs; a rules specification language configured to define stateful rules for runtime verification of the target system including constructs to specify timed state transitions for at least some of the stateful rules, the rules specification language supporting predictive evaluation timing in which an indication of when to evaluate the timing for the timed state transitions is included within corresponding stateful rules; one or more of the stateful rules including one or more rules that specify timed state transitions for verification of the target system defined in accordance with the rules specification language; and a run-time verifier module configured to apply the one or more stateful rules to generate verification checks for interactions between the API provider and the API clients for run-time verification of the target system to verify adherence to the stateful rules prescribed for the target system, the run-time verifier module comprising an interceptor module configured to intercept calls to APIs issued by the API clients or calls to the API clients from the API provider and initiate application of corresponding verification checks based on the calls that are intercepted.

2. The computing system as described in claim 1, wherein the stateful rules are defined using the rules specification language as transitions on state elements associated with the interactions between the API provider and the one or more API clients.

3. The computing system as described in claim 2, wherein the timed state transitions impose timing constraints upon corresponding transitions on the state elements associated with the interactions between the API provider and the one or more API clients.

4. The computing system as described in claim 1, wherein the timed state transitions are configured to detect situations in which expected states of finite state machines associated with corresponding stateful rules are not reached within prescribed time limits.

5. The computing system as described in claim 1, wherein the constructs to implement the timed state transitions enable explicit definition of a time limit to associate with a transition from a source state to a destination state.

6. The computing system as described in claim 1, wherein the constructs to implement the timed state transitions include a timing parameter to store a timestamp associated with a source state for comparison to a current time in relation to time limits defined for the timed state transitions.

7. The computing system as described in claim 1, wherein evaluation of the timing for the timed state transitions that are specified includes setting a different local timer for each timed state transition that increments when a thread for the local timer is allocated processing resources and is suspended when the thread is suspended.

8. The computing system as described in claim 1, wherein evaluation of the timing for the timed state transitions comprises setting a global timer for the timed state transitions and evaluating local timers associated with each timed state transition at an evaluation interval controlled according to the global timer.

9. The computing system as described in claim 1, wherein timers used to implement the evaluation of one or more of said timed state transitions are assigned a lowest available priority to prevent misrecognition of hangs due to preemptive scheduling.

10. The computing system as described in claim 1, wherein the run-time verifier module includes a checker module that is configured to: retrieve definitions for the stateful rules that are identified as applicable to the target system; and automatically derive corresponding verification checks from the definitions of the stateful rules that are retrieved, the verification checks including code to implement the timed state transitions defined by the stateful rules.

11. A method implemented by one or more computing devices comprising: implementing a rules specification language to define rules for application programming interface (API) run-time verification of target systems in terms of transitions for state machines associated with events and that supports timed state transitions for the rules, the rules specification language supporting predictive evaluation timing in which an indication of when to evaluate the timing for the timed state transitions is included within corresponding rules; creating one or more of the rules for run-time verification of the target systems that specify the timed state transitions in accordance with the rules specification language; performing the API run-time verifications of the target systems using the one or more rules that specify the timed state transitions, the timed state transitions imposing timing constraints upon corresponding transitions for the state machines associated with interactions between API providers and one or more API clients of the target systems; monitoring conditions in which an API of the target systems fails to execute within constraints imposed by the specified timed state transitions; and responsive to the API of the target system failing to execute within the timed state transitions specified by the rules, firing an event to trigger a corresponding reaction.

12. A method as described in claim 11, wherein performing the API run-time verifications of the target systems using the one or more rules that specify the timed state transitions comprises: instantiating one or more timers for the timed state transitions to track timing of the interactions in the target system; and evaluating the one or more timers to verify compliance with the timing constraints imposed by the one or more rules upon the transitions for the state machines.

13. A method as described in claim 11, wherein the API run-time verifications comprise verifications of drivers that interact with system APIs provided by an operating system of the computing device.

14. One or more computer-readable storage media storing instructions that, when executed by one or more components of a computing system, implement a verification platform configured to perform operations including: deriving verification checks for run-time verification of a target system from stateful rules including at least some rules that impose time limits on state transitions defined by the rules; initiating timers for one or more state transitions upon which time limits are imposed in connection with run-time verification of a target system, at least one of the time limits being hardware specific and based on protocols defined for interaction involving the specific hardware; express the stateful rules in relation to application programming interface (API) interactions of API clients with an API provider of the target system in terms of the one or more state transitions that occur for state machines associated with the API interactions, the stateful rules defined in accordance with a specification language that supports predictive evaluation timing in which an indication of when to evaluate the timing for timed state transitions is included within corresponding stateful rules; evaluating the timers initiated for the one or more state transitions relative to corresponding time limits; and responsive to the one or more state transitions failing to execute within the corresponding time limits specified by the rules, firing an event to trigger a corresponding reaction.

15. One or more computer-readable storage media as recited in claim 14, wherein the stateful rules are further defined in accordance with the specification language configured to at least: provide constructs to specify the time limits imposed on the state transitions; and implement a formalized description and comment structure for the stateful rules to facilitate specification of the corresponding reaction occurring responsive to the one or more state transitions failing to execute within the time limits imposed on the state transitions.

16. One or more computer-readable storage media as recited in claim 14, wherein deriving verification checks for run-time verification of the target system comprises: identifying stateful rules implicated by interactions of components of the target system; deriving run-time code to implement the verification checks for the identified stateful rules from definitions of the identified rules, the definitions specifying the time limits to impose on state transitions defined by the rules; and injecting the run-time code to implement the verification checks into the target system.

17. One or more computer-readable storage media as recited in claim 14, wherein: initiating the timers includes instantiating one or more local timers for each of the one or more state transitions upon which the time limits are imposed and a global timer to implement a periodic interval for evaluation of the local timers to check compliance with corresponding time limits; and evaluating the timers includes comparing the one or more local timers to corresponding time limits at the periodic interval implemented by the global timer.

18. The computing system as described in claim 1, the run-time verifier module further configured to fire an event to trigger a corresponding reaction responsive to APIs of the target system failing to execute within the timed state transitions specified by the rules.

19. One or more computer-readable storage media as recited in claim 14, wherein evaluating the timers includes: intercepting calls to APIs issued by the API clients or calls to the API clients from the API provider; and applying the one or more stateful rules to generate verification checks for interactions between the API provider and the API clients for run-time verification of the target system to verify adherence to the stateful rules prescribed for the target system.

20. A method as described in claim 11, wherein performing the API run-time verifications of the target systems comprises: intercepting calls to the APIs issued by the one or more API clients or calls to the one or more API clients from the API providers.

\* \* \* \* \*